United States Patent
Sguazzotti et al.

(10) Patent No.: US 7,346,280 B1
(45) Date of Patent: Mar. 18, 2008

(54) BI-DIRECTIONAL LONG HAUL/ULTRA LONG HAUL OPTICAL COMMUNICATION LINK

(75) Inventors: Alessandro Sguazzotti, Milan (IT); Fransisco Martinez Rodriguez, Oggiono (IT); Marco Mazzini, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 832 days.

(21) Appl. No.: 10/099,488

(22) Filed: Mar. 15, 2002

(51) Int. Cl.
*H04J 14/02* (2006.01)

(52) U.S. Cl. .................. 398/92; 398/157; 398/104; 398/42; 359/334; 359/337.12; 359/341.2; 359/341.3; 359/341.33

(58) Field of Classification Search .............. 398/92, 398/42, 157, 104; 359/334, 337.12, 341.2, 359/341.3, 341.33
See application file for complete search history.

(56) References Cited

U.S. PATENT DOCUMENTS

| | | | |
|---|---|---|---|
| 5,812,306 A * | 9/1998 | Mizrahi | 359/341.2 |
| 5,815,308 A * | 9/1998 | Kim et al. | 359/341.2 |
| 6,018,404 A | 1/2000 | Meli et al. | 359/134 |
| 6,081,368 A | 6/2000 | Delavaux | 359/341 |
| 6,160,660 A * | 12/2000 | Aina et al. | 359/341.2 |
| 6,493,133 B1 * | 12/2002 | Liang et al. | 359/349 |
| 6,687,426 B1 * | 2/2004 | May et al. | 385/15 |
| 6,751,414 B1 * | 6/2004 | Davies et al. | 398/41 |
| 6,862,132 B1 * | 3/2005 | Casaccia et al. | 359/334 |
| 6,941,074 B2 * | 9/2005 | Nakamura et al. | 398/92 |
| 6,961,522 B1 * | 11/2005 | Castagnetti et al. | 398/92 |
| 2001/0038478 A1 | 11/2001 | Hwang | 359/124 |
| 2002/0093708 A1 | 7/2002 | Johlen | 359/124 |

OTHER PUBLICATIONS

"Parametric amplifier", Hargrave's communications dictionary, Wiley (2001).*
"Combination of Raman and Erbium Amplifiers Provides Better System Performance", Understanding Optical Networking, Telecommunications Research Associates, 2002.*

* cited by examiner

*Primary Examiner*—Jason Chan
*Assistant Examiner*—Wai Lun Leung
(74) *Attorney, Agent, or Firm*—Aka Chan LLP

(57) ABSTRACT

A bi-directional configuration is employed to implement a hybrid ultra long haul (ULH)/long haul (LH) optical transmission system. The link carries ULH channels and LH channels in opposite directions in different bands. Raman amplification is employed for the ULH band while Erbium-doped fiber amplification (EDFA) is used for both the LH and ULH bands. Optical circulators are employed for multiplexing and demultiplexing. This solution does not incur the ripple penalty of prior art solutions based on interferential filters while providing excellent isolation between the ULH and LH channels and bi-directional communication within a single fiber.

9 Claims, 5 Drawing Sheets

BI-DIRECTIONAL LONG HAUL/ULTRA LONG HAUL OPTICAL COMMUNICATION LINK

BACKGROUND OF THE INVENTION

The present invention relates to optical communication links and more particularly to wavelength division multiplexing (WDM) links.

WDM optical communication links have evolved to incorporate the capacity to transmit optical signals over very large distances, e.g., greater than 1000 km without regeneration of the optical signal while carrying more than 200 channels at 10 Gbps. Such systems are referred to as ultra long haul (ULH) dense WDM (DWDM) systems.

It is desirable to implement a ULH link as a part of a hybrid system where certain wavelengths are configured for ULH operation while other wavelengths that are added and/or dropped along the way need merely achieve a reach of e.g., 500-700 kms. Thus so-called long haul (LH) and ULH are transmitted on the same fiber but on different wavelengths.

Due to the shorter reach of the LH wavelengths, it is not necessary to provide the same type of amplification resources as are needed for ULH operation. While the ULH link typically employs Raman amplification in addition to Erbium-doped fiber amplifiers (EDFAs) at each of a series of amplification sites along the link, the LH system generally requires only EDFA amplification technology to achieve the needed performance.

Current hybrid LH/ULH systems assign different transmission bands to LH and ULH operation. For example, the "C" band could be assigned to LH while "L" band would be assigned to ULH or vice versa. Separate C band and L band EDFAs are provided. To implement this type of system it is necessary to demultiplex and then remultiplex the two bands at each optical amplification site along the link to accommodate the separate single-band amplifiers while avoiding crosstalk between the bands. Interferential filters are typically used to provide the necessary demultiplexing and remultiplexing due to their high isolation, large transmission bandwidth, and low insertion loss.

A problem arises, however, in the use of optical interferential filters for this purpose. There will typically be amplitude ripple in the passband of the filter response. If a link includes 20 intermediate amplification sites where multiplexing and demultiplexing operations need be performed, there may be more than forty filters used for this purpose. If the filter ripple of the numerous filters is fairly correlated among the multiple filters, the overall link frequency response may be subject to relatively large peaks and nulls. This can cause certain wavelengths to fail to meet signal to noise ratio requirements for correct receiver operation. Given that the interferential filters installed along a link will typically be produced by the same manufacturer and be of the same model, a close correlation of ripple peaks and ripple nulls in the frequency domain can be expected. There is no way to readily compensate for the resulting accumulation of ripple along the link.

What is needed is a configuration for hybrid LH/ULH operation that avoids the frequency response ripple introduced by interferential filters used for multiplexing and demultiplexing along the link.

SUMMARY OF THE INVENTION

By virtue of one embodiment of the present invention, a bi-directional configuration is employed to implement a hybrid ultra long haul (ULH)/long haul (LH) optical transmission system. The link carries ULH channels and LH channels in opposite directions in different bands. Raman amplification is employed for the ULH band while Erbium-doped fiber amplification (EDFA) is used for both the LH and ULH bands. Optical circulators are employed for multiplexing and demultiplexing. This solution does not incur the ripple penalty of prior art solutions based on interferential filters while providing excellent isolation between the ULH and LH channels and bi-directional communication within a single fiber.

A first aspect of the present invention provides a method for operating a bi-directional optical communication link. The method includes: transmitting a first WDM signal in a first subband in a first direction through the optical communication link, transmitting a second WDM signal in a second subband in a second direction through the optical communication link, the second direction being opposite the first direction, at a line amplification site, employing a first Erbium-doped fiber amplifier to amplify the first WDM signal and at the line amplification site, injecting pump energy into a first fiber of the link to induce Raman amplification of the second WDM signal.

A second aspect of the present invention provides apparatus for amplification in a bi-directional optical communication link. The apparatus includes: a first Erbium-doped fiber amplifier that amplifies a first WDM signal that occupies a first subband, and propagates through the bi-directional optical communication link, and a Raman pump module that injects pump energy into a first span of the bi-directional optical communication link to induce Raman amplification of a second WDM signal that occupies a second subband that propagates through the bi-directional communication link in a direction opposite a direction of propagation of the first WDM signal.

Further understanding of the nature and advantages of the inventions herein may be realized by reference to the remaining portions of the specification and the attached drawings.

DESCRIPTION OF SPECIFIC EMBODIMENTS

The present invention will now be described with reference to an exemplary embodiment that combines long haul (LH) and ultra long haul (ULH) optical communication capabilities on the same fiber. The present invention is, however, not limited to this particular application.

In one embodiment, an LH link and a ULH link share the same fiber but employ signals propagating in different directions and on different bands. For example, the ULH link may employ the L band while the LH link employs the C band or vice versa. The term "L band" here generally refers to a band that lies in the range from approximately 1565 to approximately 1615 nm. The term "C band" generally refers to a band that lies in the range from approximately 1525 to approximately 1565 nm. The L band and the C band are given as examples. Any two non-overlapping bands may be used.

Overall, there may be more than 200 WDM channels, each carrying, e.g., 10 Gbps. The link is divided into multiple spans. Between each span there is an amplification site to provide all-optical amplification of the signals propagating in both directions. The ULH signal will typically travel the entire extent of the link, e.g., greater than 1000 km while optical add drop multiplexers (OADMs) will be used to tap off and substitute LH channels along the link.

Figure 1:
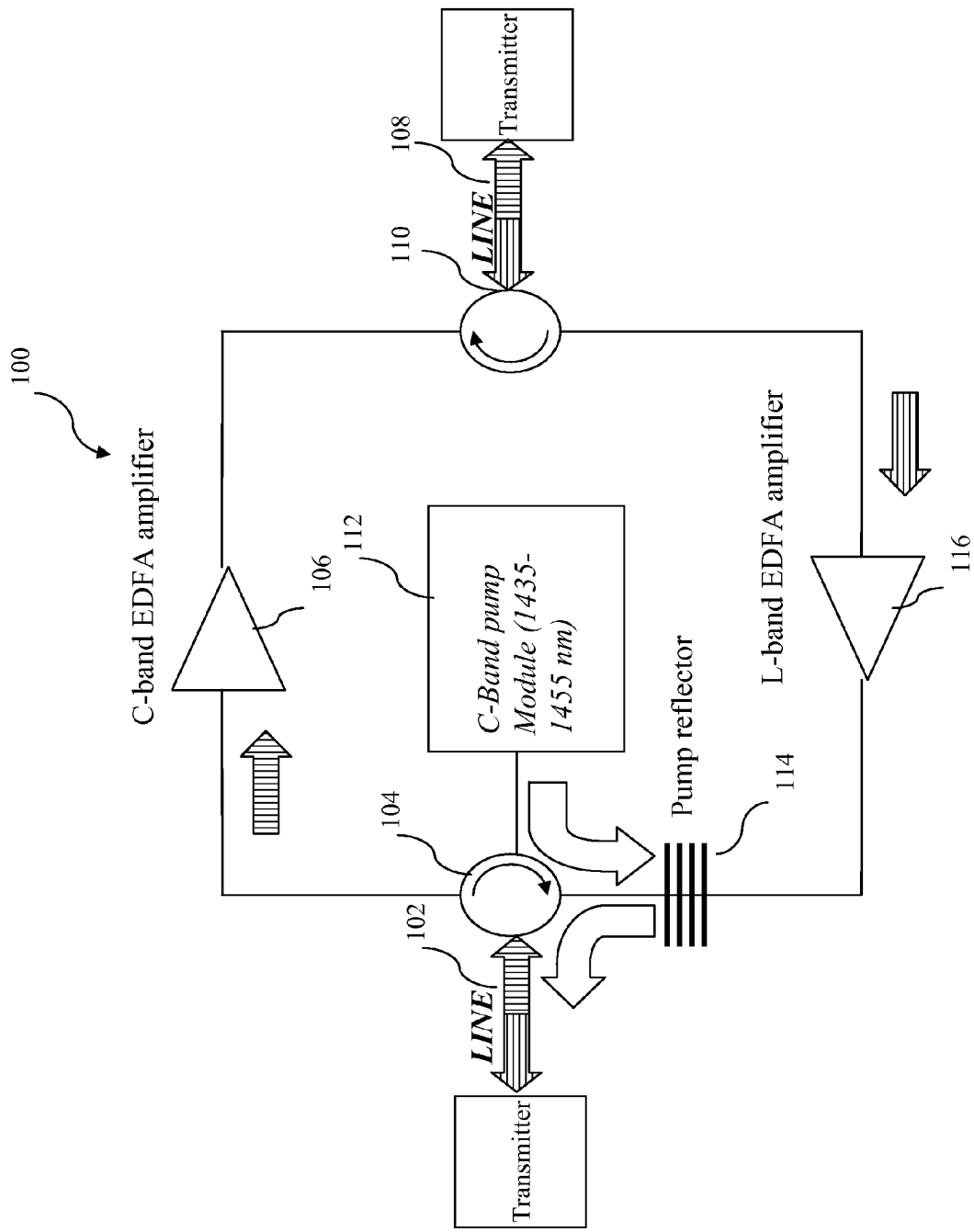
FIG. 1 depicts an amplification system as would be installed at a line site in a hybrid LH/ULH system according to one embodiment of the present invention.

FIG. 1 depicts a line site structure 100 as would be installed between spans along the link. Line site structure 100 combines the use of Erbium-doped fiber amplifier (EDFA) technology with distributed Raman amplification (DRA) technology. EDFAs are used for both the LH and the ULH signals while Raman amplification is used only for the ULH signal. In line site structure 100, the ULH signal occupies the C-band while the LH signal occupies the L-band. In the depiction of line site structure 100, the ULH signal generally flows from left to right while the LH signal generally flows from right to left.

Consider first the handling of the ULH signal. From a preceding span 102 the ULH signal enters a 4-port optical circulator 104, exiting circulator 104 to encounter a C-band EDFA 106. After EDFA 106, the amplified ULH signal is coupled to a next span 108 via a 3-port optical circulator 110. In addition to the EDFA, the C-band ULH signal is also subject to distributed Raman amplification. A C-band pump module 112 provides coherent optical energy at one or more pump wavelengths between 1435 and 1455 nm. This pump energy is coupled into span 102 via circulator 104 and a fiber Bragg grating 114 configured to reflect optical energy at the pump wavelengths and transmit optical energy at other wavelengths. The Raman pump energy is thus inserted into span 102 in a counter-propagating direction relative to the ULH signal to be amplified.

The LH signal is coupled from span 108 into an L-band EDFA 116 via circulator 110. The amplified LH signal passes through fiber Bragg grating 114 and optical circulator 104 into span 102.

Figure 2:
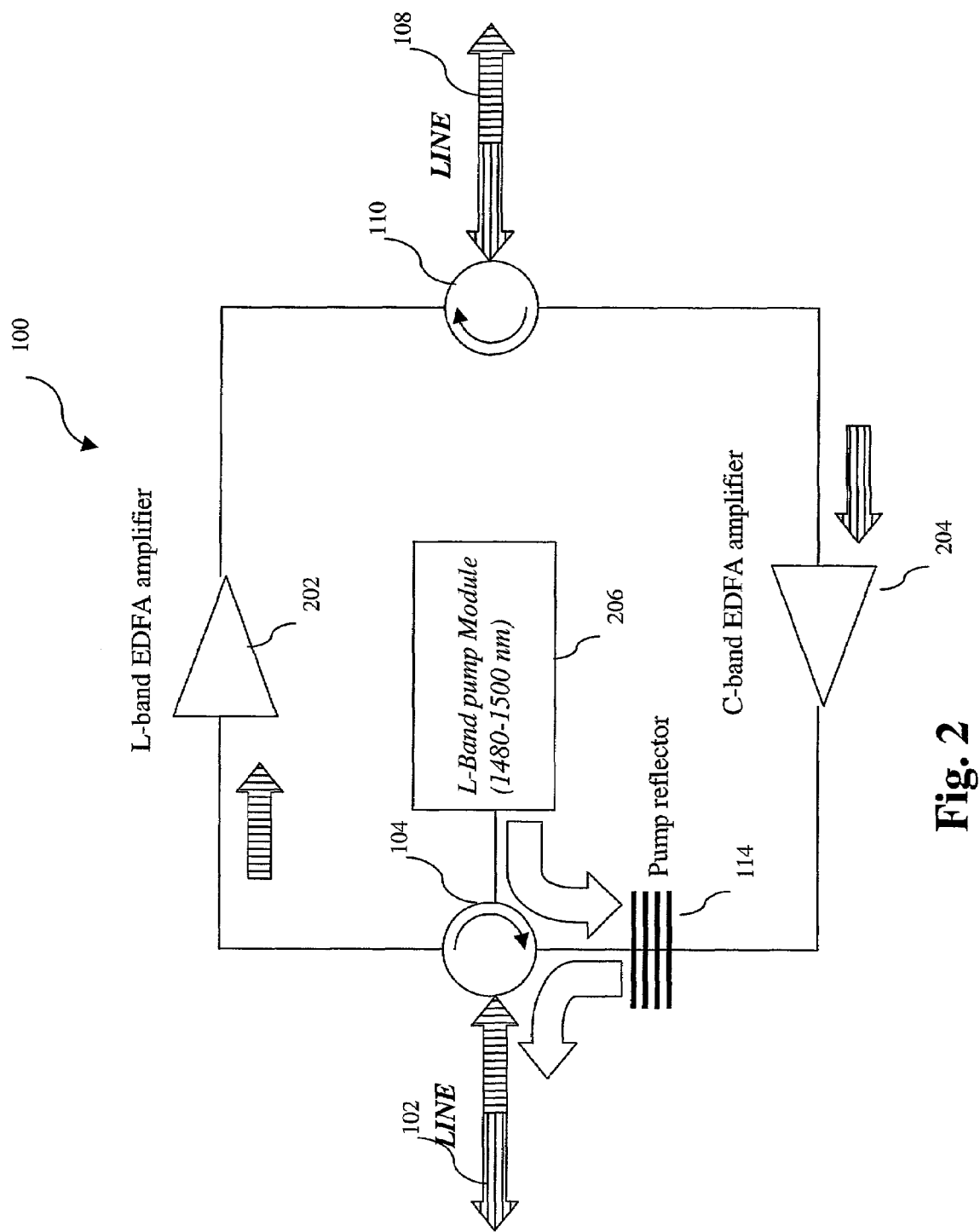
FIG. 2 depicts an alternative amplification configuration for the amplification system of FIG. 1.

FIG. 2 depicts an alternative configuration wherein the ULH signal is positioned in the L-band while the LH signal is positioned in the C-band. Circulators 104 and 110 operate as in FIG. 1 as does pump reflector 114. The ULH signal is now input to an L-band EDFA amplifier 202 while the LH signal encounters a C-band EDFA amplifier 204. Distributed Raman amplification is accomplished by use of an L-band pump module 206 that generates coherent optical pump energy at one or more wavelengths between 1480 and 1500 nm.

Thus, the multiplexing and demultiplexing of the ULH and the LH signals is accomplished through the use of optical circulators, taking advantage of the different directions of propagation of the signals. The circulators have low insertion loss and do not introduce ripple into the overall transmission response. The isolation between subbands is provided by the bi-directional configuration where signals travel in counter-propagating direction relative to one another. Each EDFA provides low gain in the other band. This avoids signal degradation and oscillation within line site structure 100 due to undesired signal reflections from spans 102 and 108.

Figure 3:
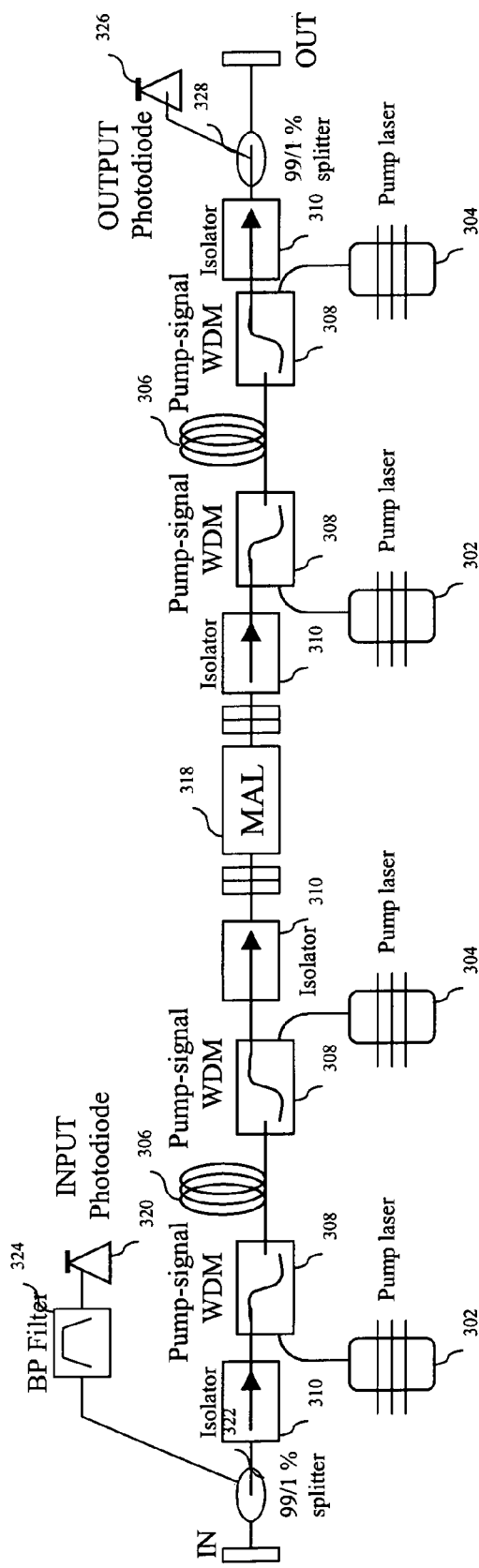
FIG. 3 depicts internal structure of an EDFA according to one embodiment of the present invention.

As will now be seen, further isolation between the bands can be provided within the EDFA internal structure by exploiting the response characteristics of pump signal wavelength division multiplexers used to inject pump energy into Erbium-doped fibers. FIG. 3 depicts an internal EDFA structure that may be used to implement one of EDFAs 106, 116, 202, or 204 according to one embodiment of the present invention. The EDFA structure is divided into two stages to provide lower noise figure and to allow for optimal placement of chromatic dispersion compensation. Each stage includes a co-propagating pump laser 302, a counter-propagating pump laser 304, and an Erbium-doped fiber 306 in which amplification occurs. Coupling of pump energy into fibers 306 is via a series of pump-signal wavelength division multiplexers 308.

For the L-band implementation of the EDFA, the pump-signal wavelength division multiplexers 308 may be designed to have an additional beneficial effect in that by incorporating a highpass filter response, they further attenuate the C band and thus provide further isolation. Also, it should be noted that this additional rejection of C band signal energy is achieved without introducing ripple.

Directional isolation is provided by a series of isolators 310. A medium access loss (MAL) 318 represents an allocated attenuation that allows for installation of a chromatic dispersion-compensating unit. A photodiode monitor 320 is coupled to the EDFA input via a splitter 322 and a bandpass filter 324. Bandpass filter 324 passes the band that carries the LH signal and rejects the ULH signal. The purpose of this monitoring structure is to avoid EDFA turn-on due to residual ULH signal. The EDFA is only permitted to activate if sufficient signal is present in the LH band. Another monitor photodiode 326 receives a small portion of the output signal via splitter 328. The output monitoring is for gain control and/or power control.

Now considering the Raman amplification operation of line site structure 100, Raman-related crosstalk is reduced due to the use of counter-propagating Raman pump energy as opposed to co-propagating pump energy which would lead to more non-linear interaction between channels. Although the Raman pump energy co-propagates relate to the LH signal, the impact of Raman crosstalk can be considered negligible for the embodiment described herein.

The performance differences between the configurations of FIGS. 1 and 2 lie mainly in the Raman amplification characteristics. For either configuration, pump wavelengths should be set so that Raman amplification gain is maximized for the ULH band. The Raman gain for the ULH band is impacted by pump depletion caused by the presence of the co-propagating LH signal. A further optimization is thus obtained when pump wavelengths are set so that the Raman gain coefficient is minimized for the LH band to lessen the pump depletion effect. These are the prime considerations in selecting Raman pumping wavelengths.

Figure 4:
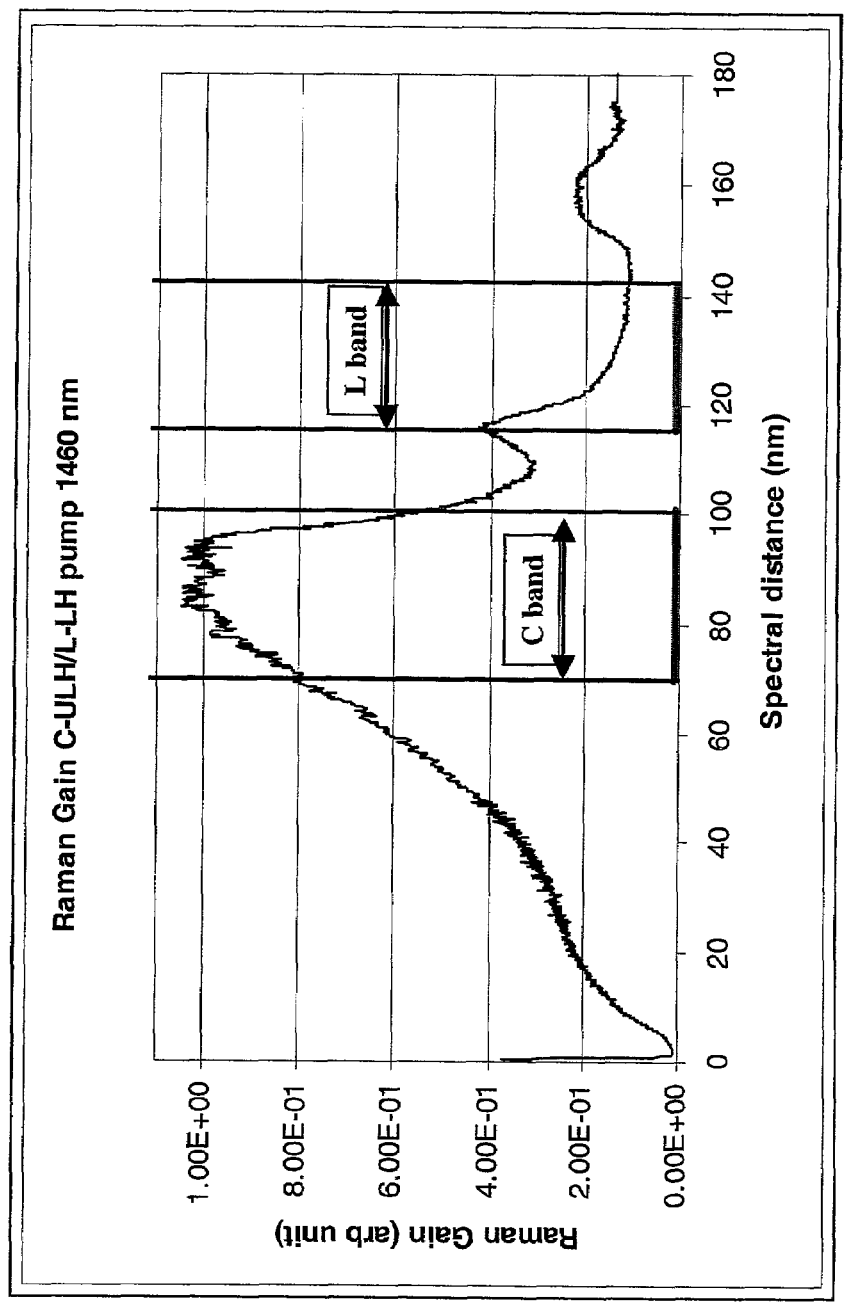
FIG. 4 depicts a Raman gain profile for the amplification system of FIG. 1.

The configuration of FIG. 1 with the pumping wavelengths centered at 1445 nm provides an LH band Raman gain coefficient that is lower than those found in traditional unidirectional configurations and also lower than the LH band Raman gain coefficient of the configuration of FIG. 2. FIG. 4 depicts a Raman gain profile over wavelength for the amplifier configuration of FIG. 1 and a single pumping wavelength at 1445 nm. The horizontal axis is calibrated in wavelength relative to this single pumping wavelength, referred to here as "spectral distance". As can be seen the gain is at a peak within the C-band and very low within the L-band. Raman crosstalk is greatly reduced due to the very low Raman gain within the L-band, and also because of the relatively large spectral distance between the L-band and the Raman pumps used for the C-band. This large spectral distance beneficially decorrelates delay among channels.

Figure 5:
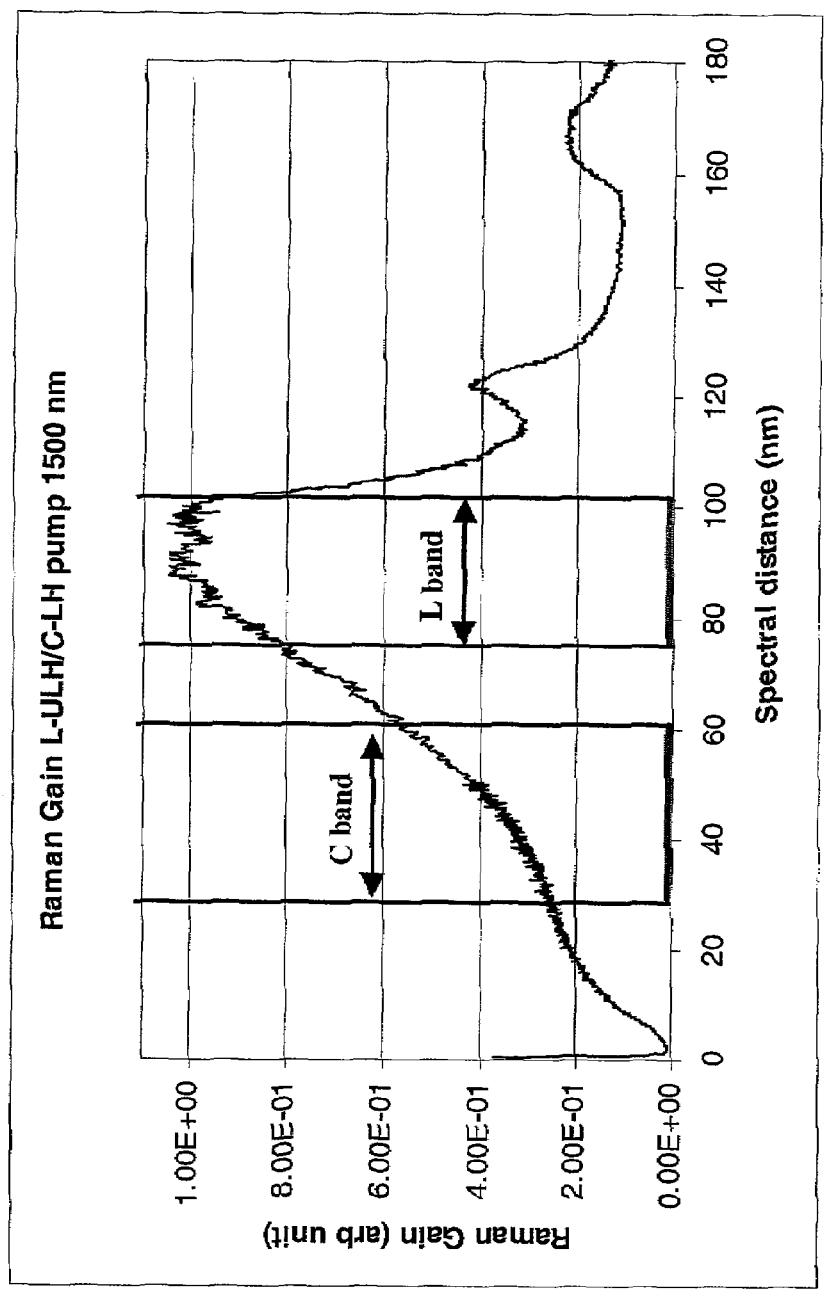
FIG. 5 depicts a Raman gain profile for the amplification system of FIG. 2.

FIG. 5 depicts the Raman gain profile for the configuration of FIG. 2 where the C-band carries the LH signal while the L-band carries the ULH signal. Here centering the pump wavelengths at 1485 nm causes the Raman gain maximum to fall within the L-band. The C-band Raman gain is somewhat higher than the LH Raman gain for the system of FIG. 1. If a system having 15 dB of ULH Raman gain is assumed, the LH Raman gain for the configuration of FIG. 2 would be greater than 5 dB as compared to 3.9 dB for the configuration of the FIG. 1. Thus, the Raman crosstalk is somewhat higher due to the co-propagation Raman pumping of the LH signal.

On the other hand, in the configuration of FIG. 2, the C-band LH signal acts like a Raman pump for the L-band ULH signal causing a slight enhancement of the Raman gain experienced by the ULH signal. Also, the stand-alone ULH gain performance is somewhat better in the configuration of FIG. 2 due to the lower transmission fiber loss in the L-band region. Thus, it will be understood that there are tradeoffs in selecting between the two configurations.

In conclusion, the bi-directional configuration provided by one embodiment of the present invention provides important advantages to hybrid LH/ULH systems. The use of optical circulators for multiplexing and demultiplexing instead of interferential filters greatly reduces the amount of ripple thus improving signal to noise ratio performance. Also, the bi-directional configuration inherently reduces costs by allowing both directions to be carried within a single fiber.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. Apparatus for amplification in a bi-directional optical communication link, said apparatus comprising:
   a first Erbium-doped fiber amplifier that amplifies a first WDM signal that occupies a first subband and propagates through said bi-directional optical communication link;
   a Raman pump module that injects pump energy into a first span of said bi-directional optical communication link to induce Raman amplification of a second WDM signal that occupies a second subband that propagates through said bi-directional communication link in a direction opposite a direction of propagation of said first WDM signal;
   a second Erbium-doped fiber amplifier that amplifies said second WDM signal;
   a first circulator having a first port coupled to said first span and a second port coupled to an input of said second Erbium-doped fiber amplifier wherein a third port of said first circulator is coupled to said Raman pump module; and
   a fiber Bragg grating coupled to a fourth port of said first circulator such that an output of said first Erbium-doped fiber amplifier is coupled to said fourth port through said fiber Bragg grating and said pump energy enters said third port, exits said fourth port, reflects from said fiber Bragg grating, and exits said first port to enter said first span.

2. The apparatus of claim 1 wherein said pump energy is injected in a direction opposite to propagation of said second WDM signal.

3. Apparatus for amplification in a bi-directional optical communication link, said apparatus comprising:
   a first Erbium-doped fiber amplifier that amplifies a first WDM signal that occupies a first subband and propagates through said bi-directional optical communication link;
   a second Erbium-doped fiber amplifier that amplifies a second WDM signal that occupies a second subband that propagates through said bi-directional optical communication link in a direction opposite to a direction of propagation of said first WDM signal;
   a Raman pump module that injects pump energy into a first span of said bi-directional optical communication link to induce Raman amplification of said second WDM signal, wherein said pump energy is injected in a direction opposite to propagation of said second WDM signal;
   a first circulator having a first port coupled to and through which said pump energy is injected into said first span, a second port coupled to an input of said second Erbium-doped fiber amplifier and a third port coupled to an output of said first Erbium-doped fiber amplifier; and
   a second circulator having a first port coupled to an output of said second Erbium-doped fiber amplifier, a second port coupled to a second span of said bi-directional optical communication link, and a third port coupled to an input of said first Erbium-doped fiber amplifier.

4. The apparatus of claim 1 wherein said first subband extends from approximately 1565 nm to approximately 1615 nm and said second subband extends from approximately 1525 nm to approximately 1565 nm.

5. The apparatus of claim 1 wherein said first subband extends from approximately 1525 nm to approximately 1565 nm and said second subband extends from approximately 1565 nm to approximately 1615 nm.

6. The apparatus of claim 1 further comprising a second circulator coupled only to a second span of said bi-directional optical communication link, an input of said first Erbium-doped fiber amplifier, and an output of said second Erbium-doped fiber amplifier.

7. The apparatus of claim 3 wherein said second circulator has only said first port coupled to said output of said second Erbium-doped fiber amplifier, said second port coupled to said second span of said bi-directional optical communication link, and said third port coupled to said input of said first Erbium-doped fiber amplifier.

8. The apparatus of claim 3 wherein said first subband extends from approximately 1565 nm to approximately 1615 nm and said second subband extends from approximately 1525 nm to approximately 1565 nm.

9. The apparatus of claim 3 wherein said first subband extends from approximately 1525 nm to approximately 1565 nm and said second subband extends from approximately 1565 nm to approximately 1615 nm.

* * * * *